United States Patent [19]

Lebez

[11] Patent Number: 5,187,016
[45] Date of Patent: Feb. 16, 1993

[54] THERMOPLASTIC COMPOSITION COMPRISING A COPOLYMER BASED ON ETHYLENE AND MALEIC ANHYDRIDE, AND INDUSTRIAL ARTICLES OBTAINED FROM SUCH A COMPOSITION

[75] Inventor: Jean Lebez, Lens, France

[73] Assignee: Atochem, Paris, France

[21] Appl. No.: 726,197

[22] Filed: Jul. 5, 1991

[30] Foreign Application Priority Data

Jul. 5, 1990 [FR] France .................. 90 08571

[51] Int. Cl.$^5$ .............. C08L 23/08; C08L 23/16; B32B 27/28; C08J 123/08; C08J 123/16
[52] U.S. Cl. .................. 428/462; 428/461; 428/463; 428/457; 428/221; 525/207; 524/451
[58] Field of Search ........... 525/207; 428/461, 462

[56] References Cited

U.S. PATENT DOCUMENTS

| | | | |
|---|---|---|---|
| 4,762,877 | 8/1988 | Heilbrunn | 525/207 |
| 4,868,052 | 9/1989 | Guerdoux et al. | 428/336 |
| 4,933,389 | 6/1990 | Hikasa et al. | 525/207 |
| 4,945,005 | 7/1990 | Aleckner et al. | 525/211 |
| 4,946,896 | 8/1990 | Mitsuno et al. | 525/207 |
| 4,957,968 | 9/1990 | Adur et al. | 525/221 |
| 4,965,319 | 10/1990 | Kawamoto | 525/221 |
| 5,047,482 | 9/1991 | Schlag et al. | 525/221 |

FOREIGN PATENT DOCUMENTS

| | | |
|---|---|---|
| 312664 | 4/1989 | European Pat. Off. . |
| 138083 | 4/1985 | Japan . |
| 8906256 | 7/1989 | World Int. Prop. O. . |

*Primary Examiner*—Carman J. Seccuro, Jr.
*Attorney, Agent, or Firm*—Burns, Doane, Swecker & Mathis

[57] ABSTRACT

The invention relates to a thermoplastic composition comprising a mixture of 25-80% by weight of at least one partially crystalline ethylene polymer or copolymer which has a density of 0.870-0.945; of 15-85% by weight of at least one random copolymer comprising 83-99.7 mol % of units derived from ethylene, 0-14 mol % of units derived from at least one acrylic or methacrylic ester, and 0.3-3 mol % of units derived from maleic anhydride; which has a melt index of 1-500 dg/min; of 1-8% by weight of at least one rubber; and of 0-8% by weight of talc; to the use of this composition for the manufacture of a film which has adhesive properties; to an industrial article comprising a metal coated with at least one layer of this composition; and to a composite film comprising at least one layer comprising this composition, with the condition that the proportion of talc in the latter does not exceed the proportion which is sufficient to provide an antiblocking effect, and at least one layer of another thermoplastic.

9 Claims, No Drawings

THERMOPLASTIC COMPOSITION COMPRISING A COPOLYMER BASED ON ETHYLENE AND MALEIC ANHYDRIDE, AND INDUSTRIAL ARTICLES OBTAINED FROM SUCH A COMPOSITION

The present invention relates to thermoplastic compositions comprising a copolymer based on ethylene, maleic anhydride and optionally alkyl acrylates or methacrylates, such compositions being particularly useful for the manufacture of films which have good adhesive properties, as well as for the production of composite films and for coating metals.

U.S. Pat. No. 4,868,052 describes a thermoplastic composition comprising an uncrosslinked mixture
(A) from 1 to 80% by weight of at least one partially crystalline ethylene polymer or copolymer with a density of 0.870 to 0.945, and
(B) from 20 to 99% by weight of at least one hydrophobic, nonelastomeric, random copolymer containing:
  (i) from 83 to 99.7 mol% of units derived from ethylene;
  (ii) from 0 to 14 mol% of units derived from at least one acrylic or methacrylic ester; and
  (iii) from 0.3 to 3 mol% of units derived from maleic anhydride,
which has a melt index of 1 to 500 dg/min. This document also describes filled thermoplastic compositions comprising 67 to 99% by weight of (A) and 1 to 33% by weight of (B) and up to 100 parts per 100 parts by weight of the mixture (A) +(B) of at least one inorganic filler.

These compositions provide industrial articles such as:
adhesive films which are capable of exhibiting good adhesive properties in respect of various substrates such as glass, polypropylene fabric, polyurethane foam and the like, such films being generally obtained from unfilled compositions, where the melt index of the copolymer (B) is chosen between approximately 1 and 30 dg/min;
moulded articles with improved impact strength, the compositions being, in this case, filled;
composite films comprising at least one layer consisting of an unfilled thermoplastic composition as defined above and at least one other layer, consisting of another thermoplastic such as, for example, polyethylene, polypropylene, poly-1-butene, poly(4-methyl-1-pentene), polyamides, polystyrene, poly(vinyl chloride) and ethylene/vinyl alcohol copolymers; and
metals coated with a first layer consisting of the said unfilled composition, it being possible for this first layer to be coated, if necessary, with at least one second layer consisting of another thermoplastic such as a low-density polyethylene, thus providing an effective protection against mechanical damage and/or moisture.

The Applicant Company has now found that if a rubber and, if appropriate, talc are incorporated in thermoplastic compositions of the abovementioned type, comprising a copolymer based on ethylene and maleic anhydride, it is possible to obtain films which have better adhesive properties, as well as composite films and metals coated with the abovementioned two-layer and three-layer systems, which have better resistance to peeling or delamination than the unfilled compositions described in U.S. Pat. No. 4,868,052.

The subject of the present invention is therefore firstly a thermoplastic composition comprising a mixture:
(A) of approximately 25 to 80% by weight of at least one partially crystalline ethylene polymer or copolymer which has a density situated between approximately 0.870 and 0.945;
(B) of approximately 15 to 85% by weight of at least one random copolymer comprising:
  (a) from approximately 83 to 99.7 mol% of units derived from ethylene;
  (b) from 0 to approximately 14 mol% of units derived from at least one acrylic or methacrylic ester; and
  (c) from approximately 0.3 to 3 mol% of units derived from maleic anhydride;
which has a melt index of approximately 1 to 500 dg/min; and
(C) from approximately 1 to 8% by weight of at least one rubber; and
(D) approximately from 0 to 8% by weight of talc.

The polymer (A) of the composition in accordance with the present invention may be
either a polymer obtained by free-radical polymerisation at high pressure and at high temperature, comprising at least 98 mol% of ethylene and not more than 2 mol% of a polar comonomer such as carbon monoxide, vinyl acetate, alkyl acrylates and alkyl methacrylates, where the alkyl group contains from 1 to 12 carbon such a polymer generally having a density approximately 0.910 and 0.935;
or a copolymer obtained in the presence of a catalyst of Ziegler type, comprising at least 79 mol% of units derived from ethylene and not more than 21 mol% of alpha-olefin units containing from 3 to 12 carbon atoms.

The minimum density of 0.870 will generally correspond to a degree of crystallinity of at least 5%. The degree of crystallinity will be generally at least 30% when the density of the copolymer (A) is at least 0.905.

For most of the applications of the composition in accordance with the present invention the melt index of the copolymer (A), determined under standard conditions (190° C., 2.16 kg load) of ASTM standard D-1238 will be advantageously chosen between approximately 0.1 and 20 dg/min.

The copolymer (B) of the composition in accordance with the present invention may be prepared by direct copolymerisation of ethylene, maleic anhydride and, optionally, an acrylic or methacrylic ester, for example at high pressure and at high temperature, such a process resulting in a random copolymer being obtained. Suitable high pressure and high temperature processes have been described, for example, in British Patent No. 2,091,745 and in U.S. Pat. Nos. 4,617,366 and 4,644,044.

The ratio of the standard melt index of the copolymer (B) to the standard melt index of polymer (A) will be preferably chosen in the range from approximately 1:6 to approximately 400:1. The choice of the respective melt indices of the polymer (A) and of the copolymer (B) will be naturally adapted to the application for which the composition of the invention is intended.

It is generally preferable that the copolymer (B) should be nonelastomeric, and this is the reason why the total proportion of the monomer(s) other than ethylene has been limited to approximately 17 mol%.

The rubber (C) may be chosen especially from butyl rubber, ethylene-propylene rubbers, ethylenepropylene-diene rubbers and their mixtures. Ethylenepropylene rubber means copolymers of 65 to 80 mol% of ethylene and 20 to 35 mol% of propylene, which have a density of 0.850 to 0.870 and which have no residual crystallinity and therefore no crystalline melting temperature. Ethylene-propylene-diene rubbers mean ethylene-propylene-diene terpolymers, the diene being chosen from conjugated or unconjugated, linear or cyclic dienes such as, for example, butadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylidene-2-norbornene, 5-(2-propenyl)-2-norbornene, 5-(5-hexenyl)- 2-norbornene, 1,5-cyclooctadiene,bicyclo[2.2.2]octa-2,5-diene, cyclopentadiene, 4,7,8,9-tetrahydroindene and isopropylidenetetrahydroindene. Such elastomeric terpolymers which can be employed in accordance with the present invention generally comprise between 15 and 60 mol% of units derived from propylene and between 0.1 and 20 mol% of units derived from the diene.

The composition according to the invention can be obtained by any one of the following processes of preparation:

simultaneous mixing by any known means, in particular in a kneader or an extruder, of the polymers (A) and (B), of the rubber and of talc;

mixing of a parent mixture of two components with the remaining components;

mixing of the polymer (A) and of talc coated with the copolymer (B) beforehand, the coating having been carried out by introducing talc into a solution of the copolymer (B) and then evaporating off the solvent. Suitable compositions of the copolymer (B) are obtained when the solvent is chosen, for example, from aliphatic, cycloaliphatic and aromatic hydrocarbons containing from 5 to 12 carbon atoms, ketones, chlorinated hydrocarbons, polyol esters and acetates and when the concentration of the copolymer (B) in the said solvent does not exceed approximately 15% by weight.

The present invention also relates to the use of the composition as defined above for the manufacture of a film which has adhesive properties.

The present invention also relates to an industrial article comprising a metal coated with at least one layer of a thermoplastic composition as described above.

In the case of these coated metals the thickness of the layer of thermoplastic composition according to the invention may range from approximately 10 to 550 $\mu$m. It is advantageous, furthermore, that the melt index of the copolymer (B) in the thermoplastic composition should be between approximately 2 and 10 dg/min.

For some specific applications, such as coating steel pipes, the coated metal may additionally comprise, between the metal and the first layer, a layer of a resin intended to improve the adhesiveness, such as, for example, an epoxy resin. In this case the epoxy resin may be mixed with a hardener (for example an anhydride or a polyaminoamide) and optionally a crosslinking agent, and then applied in the liquid state to the metal to be coated, in a thickness of approximately 10 to 200 $\mu$m.

The process for coating a metal with the first layer comprises coating the metal substrate at a temperature of between approximately 140° C. and 300° C. with a film consisting of the thermoplastic composition described above, the speed of travel of the said metal substrate being between approximately 1 and 600 meters per minute. For example, the said speed of travel will be advantageously chosen between 40 and 600 meters per minute in the case of steel pipes.

The metal substrate may be of any shape whatever, such as plates, sheets or pipes, with a thickness of at least 25 $\mu$m.

The coated metals in accordance with the invention have varied and widespread uses. For example, coated aluminium sheets in accordance with the invention can be employed in the foodstuffs packaging industry to protect produce against moisture and to preserve its aroma. As another example, the coating process of the invention can be applied to steel pipes such as pipes for conveying oil or gases, thus enabling them to be protected against oxidation and impacts. In the latter case it is preferable that the film of the thermoplastic composition in accordance with the invention should be coated with a layer, which has a thickness of especially from approximately 50 to 5000 $\mu$m, of another thermoplastic such as a polyethylene with a density of between 0.870 and 0.945, which may contain a filler such as carbon black.

Another subject of the present invention is a composite film comprising:

(a) at least one layer comprising a thermoplastic composition as described above, with the condition that the proportion of talc in the said composition does not exceed the proportion which is sufficient to provide an antiblocking effect, that is to say approximately 0.3% by weight, and (b) at least one layer of another thermoplastic.

This other thermoplastic may be chosen from polyesters, polyethylene, polypropylene, poly-1-butene, poly(4-methyl-1-pentene), polyamides, polystyrene, poly(-vinyl chloride) and ethylene/vinyl alcohol copolymers.

The thickness of the layer according to the invention in such a composite may range from approximately 5 to 100 $\mu$m and that of the other thermoplastic composition from approximately 20 $\mu$m to approximately 3,000 $\mu$m and depends on the thermoplastic employed. For example, it is usually from approximately 20 to 100 $\mu$m in the case of polyethylene, polypropylene, poly-1-butene, polyamides and ethylene/vinyl alcohol copolymers, from approximately 25 to 2,000 $\mu$m in the case of poly(-vinyl chloride) and from 100 to 3,000 $\mu$m in the case of polystyrene. Each of these layers can be obtained by extrusion through a flat die or by blow-extrusion through a cylindrical die.

The composite films of the invention can be obtained by coextrusion of the two thermoplastics by means of a flat die or a cylindrical die, preferably at a rate of approximately 2 to 200 meters per minute and at a temperature ranging from approximately 170° C. to 290° C. When a cylindrical die is employed, the blow ratio is preferably chosen to be between approximately 1 and 4.

The following examples illustrate the present invention without, however, limiting its scope. The standard employed for measuring the melt index is ASTM standard D 1238-73 (melt index measured at 190° C. under 2.16 kg, and expressed in dg/min). The percentages shown are by weight unless shown otherwise. The tests employed are the following:

Test for peeling of a two-layer composite applied to metal

A sandblasted steel plate and a plate of coating polyethylene (PEc) are heated to 190° C. for 10 minutes, the two plates being 12×7×0.2 cm in size.

A layer of the composition according to the invention and of comparative composition is applied to the steel plate in a thickness of 0.32 μm and the PEc plate is then placed. Cohesion is ensured by passing a roller over and the assembly is then cooled for 5 minutes in running water.

After 2 hours at rest, the peeling force is measured on a specimen 10 cm in width with the aid of a tensometer, at a speed of 32 mm/minute. The result is expressed in kg/5 cm (N/5 cm).

Test for peeling of a three-layer composite applied to metal

The procedure is as in the preceding test, except that a thin layer (50 μm in thickness) of epoxy resin is applied to the steel plate.

Test for delamination of a two-layer composite (composition of the invention or comparative composition)-polyester A three-layer composite is manufactured with the aid of a compression press, in the following manner:

10 g/m² of the composition according to the invention or of a comparative composition are placed between two Terphane ® (polyester) plates, 350×350 mm, 170 μm in thickness. Contact is maintained under a force of 49 N at a temperature of 150° C. On demoulding after 24 hours at rest, a composite plate approximately 160 μm in thickness is obtained.

The force for peeling one polyester layer (the other acting as support) is then measured with a tensometer at a speed of 25 mm/minute. The result is expressed in kg/5 cm (N/5 cm).

EXAMPLE 1

A composition formulated as follows (in %) is prepared by hot compounding:

| | |
|---|---|
| Ethylene/1-butene copolymer of density 0.910, which has a melt index of 1, a crystalline melting peak of 116° C. and a crystallinity of 30%, marketed under the name Norsoflex ® FW 1600 | 43 |
| Terpolymer containing 92% of ethylene, 5% of butyl acrylate and 3% of maleic anhydride, which has a melt index of 1.0 and a density of 0.940, marketed under the name Lotader ® 2200 | 50 |
| Butyl rubber of Mooney viscosity 1 + 8 at 125° C. of 50–51 | 3 |
| Talc | 4 |

EXAMPLES 2 and 3

The procedure is as in Example 1, except that butyl rubber is replaced with ethylene-propylene rubber of Mooney viscosity 1+8 at 127° C. of 55 (Example 2) or with ethylene-propylene-diene rubber of Mooney viscosity 1+8 at 127° C. of 35–45 (Example 3).

EXAMPLE 4

COMPARATIVE

The procedure is as in Example 1, except that neither talc nor rubber is employed and that the remaining two constituents are employed in the weight ratio 50:50.

Results of the peeling tests

| Composite type | PEc | Intermediate adhesive layer composition of Example | Peeling at 20° C. | |
|---|---|---|---|---|
| | | | Start | Plateau |
| Three-layer | RLDPE* | 4 (Comp) | 100 (981) | 115 (1128.15) |
| | | 1 | 140 (1373.4) | 130 (1275.3) |
| | | 2 | 155 (1520.6) | 100 (981) |
| | | 3 | 120 (1177.2) | 100 (981) |
| | HDPE** | 4 (Comp) | 130 (1275.3) | 120 (1177.2) |
| | | 1 | 160 (1569.6) | 150 (1471.5) |
| | | 2 | 160 (1569.6) | 140 (1373.4) |
| | | 3 | 155 (1520.6) | 140 (1373.4) |
| Two-layer | RLDPE* | 4 (Comp) | 50 (490.5) | 30 (294.3) |
| | | 1 | 100 (981) | 80 (784.8) |
| | | 2 | 90 (882.9) | 50 (490.5) |
| | | 3 | 90 (882.9) | 50 (490.5) |
| | HDPE** | 4 (Comp) | 50 (490.5) | 20 (196.2) |
| | | 1 | 130 (1275.3) | 140 (1373.4) |
| | | 2 | 130 (1275.3) | 80 (784.8) |
| | | 3 | 90 (882.9) | 70 (686.7) |

*RLDPE: Radical low density polyethylene
**HDPE: High density polyethylene

EXAMPLE 5

A composition formulated as follows (in %) is prepared by hot compounding:

| | |
|---|---|
| Norsoflex ® FW 1600 | 46 |
| Lotader ® 2200 | 47 |
| Butyl rubber | 3 |
| Talc | 4 |

Results of the peeling tests

| Composite type | PEc | Peeling | | | |
|---|---|---|---|---|---|
| | | After 24 hours | | After 4000 hours of ventilated oven at 75° C. | |
| | | Start | Plateau | Start | Plateau |
| Three-layer | PEc1* | 140 (1373.4) | 190 (1863.9) | 125 (1226.25) | 150 (1471.5) |
| | PEc2** | 130 (1275.3) | 100 (981) | 125 (1226.25) | 130 (1275.3) |

Results of the peeling tests

| Composite type | PEc | Peeling | | | |
|---|---|---|---|---|---|
| | | After 24 hours | | After 4000 hours of ventilated oven at 75° C. | |
| | | Start | Plateau | Start | Plateau |
| Two-layer | PEc1 | 105 (1030.05) | 140 (1373.4) | 90 (882.9) | 175 (1716.75) |
| | PEc2 | 130 (1275.3) | 100 (981) | 230 (2256.3) | 215 (2109.15) |
| Two-layer*** | PEc1 | 55 (539.55) | 100 (981) | 20 (196.2) | 50 (490.5) |
| | PEc2 | 100 (981) | 60 (588.6) | 205 (2011.05) | 225 (2207.25) |

*PEc1 = Radical low density polyethylene compound of density 0.923, melt index 0.3, in which 3% of carbon black has been incorporated, marketed under the name Lotrene ® TB 3026^SP
**PEc2 = High density polyethylene marketed by Hoechst
***Steel plate heated only to 130° C.

EXAMPLE 6

The composition formulated as follows (in %) is prepared by hot compounding:

| | |
|---|---|
| Norsoflex ® FW 1600 | 19 |
| Ethylene-1-butene low density copolymer (d = 0.900) of flow index 1.1, marketed under the name Norsoflex ® FW 1900 | 18.5 |
| Terpolymer containing 85% by weight of ethylene, 12% by weight of ethyl acrylate and 3% by weight of maleic anhydride, of melt index 2.4, density 0.94, marketed under the name Lotader ® TX 8030 | 53 |
| Talc | 3.5 |
| Butyl rubber | 5 |

EXAMPLE 7

The following composition is prepared by hot compounding:

| | |
|---|---|
| Norsoflex ® FW 1600 | 67 |
| Lotader ® TX 8030 | 25 |
| Talc | 3 |
| Butyl rubber | 5 |

Results of the peeling tests

| Composite type | PEc | Adhesive composition of example | Peeling test at 20° C. | |
|---|---|---|---|---|
| | | | Start | Plateau |
| Three-layer | PEc3* | 6 | 115 (1128.15) | 80 (784.8) |
| | PEc2 | | 125 (1226.25) | 90 (882.9) |
| Two-layer | PEc3 | 6 | 90 (882.9) | 90 (882.9) |
| | PEc2 | | 100 (981) | 80 (784.8) |
| Three-layer | PEc3 | 7 | 90 (882.9) | 90 (882.9) |
| | PEc2 | | 125 (1226.25) | 115 (1128.15) |
| Two-layer | PEc3 | 7 | 80 (784.8) | 55 (539.55) |
| | PEc2 | | 70 (686.7) | 60 (588.6) |

*PEc: Compound of radical low density polyethylene d = 0.934, melt index 0.3 and containing 2.4% of carbon black, marketed under the name "Lotrene ® TE 3017"

EXAMPLE 8

The composition formulated as follows (melt index: 1.4) is prepared by hot compounding:

| | |
|---|---|
| Norsoflex ® FW 1600 | 19 |
| Norsoflex ® FW 1500 | 20 |
| Lotader ® TX 8030 | 50 |
| Butyl rubber | 5 |
| Masterbatch containing 30% of talc and 70% of Lotader ® TX 8030 | 6 |

Results of the peeling tests

| Composite type | PEc | Peeling test at 20° C | |
|---|---|---|---|
| | | Start | Plateau |
| Three-layer | PEc3 | 125 (1226.25) | 110 (1079.1) |
| | PEc2 | 100 (981) | 50 (490.5) |

EXAMPLES 9 to 12

The compositions formulated as follows are prepared by hot compounding:

| Ingredients | Examples | | | |
|---|---|---|---|---|
| | 9 | 10 (Comparative) | 11 | 12 |
| Norsoflex ® FW 1600 | 19 | 19 | 39 | 19 |
| Norsoflex ® FW 1900 | 0 | 0 | 0 | 20 |
| Lotader ® TX 8030 | 77 | 76 | 50 | 50 |
| Butyl rubber | 4 | 0 | 5 | 5 |
| Masterbatch containing 30% of talc and 70% of Lotader ® TX 8030 | 0 | 5 | 6 | 6 |

Results of the tests for delamination of a polyester composite

| Composition of Example | Melt index | Peeling test | |
|---|---|---|---|
| | | Start | Plateau |
| 9 | 2.10 | 110 (1079.1) | 120 (1177.2) |
| 10 | 2.00 | 95 (931.95) | 105 (1030.05) |
| 11 | 1.5 | 87.5 (858.4) | 105 (1030.05) |
| 12 | 1.4 | 105 (1030.05) | 95 (931.95) |

I claim:

1. A thermoplastic composition comprising a mixture of:

(A) 25 to 80% by weight of at least one partially crystalline ethylene polymer or copolymer which has a density between 0.870 and 0.945 wherein said polymer is at least 98 mol % of ethylene and not more than 2 mol % of a polar comonomer selected from the group consisting of carbon monoxide vinyl acetate, alkyl acrylates and alkyl methacrylate where the alkyl group contains from 1 to 12 carbon atoms or a copolymer containing at least 79 mol % of units derived from ethylene and not more than 21 mol % of alpha-olefin units containing from 3 to 12 carbon atoms;

(B) 15 to 85% by weight of at least one random copolymer containing:
   (a) from 83 to 99.7 mol % of units derived from ethylene;
   (b) from 0 to 14 mol % of units derived from at least one acrylic or methacrylic ester; and
   (c) from 0.3 to 3 mol % of units derived from maleic anhydride;
which has a melt index of 1 to 500 dg/min; and (C) 1 to 8% by weight of at least one rubber which has no residual crystallinity, wherein said rubber is butyl rubber, ethylene-propylene rubbers, ethylene-propylene-diene rubbers or their mixtures; and (D) 0 to 8% by weight of talc.

2. An adhesive film comprising the composition as defined in claim 1.

3. An industrial article comprising a metal coated with at least one layer of a thermoplastic composition according to claim 1.

4. An article according to claim 3, characterized in that the thickness of said layer of a thermoplastic composition ranges from 10 to 500 μm.

5. An article according to either of claims 3 or 4, characterized in that the melt index of the copolymer (B) in the thermoplastic composition ranges from 2 to 10 dg/min.

6. An article according to any one of claims 3 to 5, characterized in that the coated metal additionally comprises, between said metal and said layer of a thermoplastic composition an intermediate layer of an epoxy resin.

7. An article according to any one of claims 3 to 6, characterized in that said layer of a thermoplastic composition is itself coated with a layer of another thermoplastic composition which has a thickness of 50 to 5000 μm.

8. An article according to claim 7, characterized in that said other thermoplastic composition is polyethylene with a density of between 0.870 and 0.945.

9. A composite film comprising:
   (a) at least one layer comprising a thermoplastic composition according to claim 1, wherein said proportion of talc in the said composition does not exceed a proportion which is sufficient to provide an anti-blocking effect, and
   (b) at least one layer of another thermoplastic.

* * * * *